No. 1,439. REISSUED MAR. 17, 1863.

T. T. WOODRUFF.

RAILROAD CAR SEAT AND COUCH.

Witnesses:

Wm. H. Bishop

John Gilman

Inventor

T. T. Woodruff

THE NORRIS PETERS CO., WASHINGTON, D. C.

UNITED STATES PATENT OFFICE.

THEODORE T. WOODRUFF, OF PHILADELPHIA, PENNSYLVANIA.

IMPROVEMENT IN RAILROAD-CAR SEATS AND COUCHES.

Specification forming part of Letters Patent No. 16,159, dated December 2, 1856; Reissue No. 1,439, dated March 17, 1863.

*To all whom it may concern:*

Be it known that I, THEODORE T. WOODRUFF, formerly of Alton, Madison county, and State of Illinois, but now of Philadelphia, in the State of Pennsylvania, have invented certain new and useful Improvements in Convertible Seats and Couches for Railroad-Cars; and I do hereby declare that the following is a full, clear, and exact description thereof, reference being had to the accompanying drawings, making part of this specification, in which—

Figure 2:
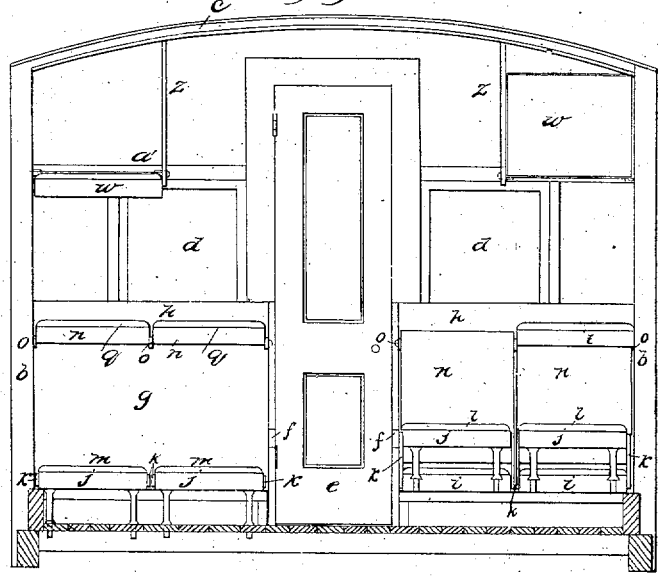
Figure 1:
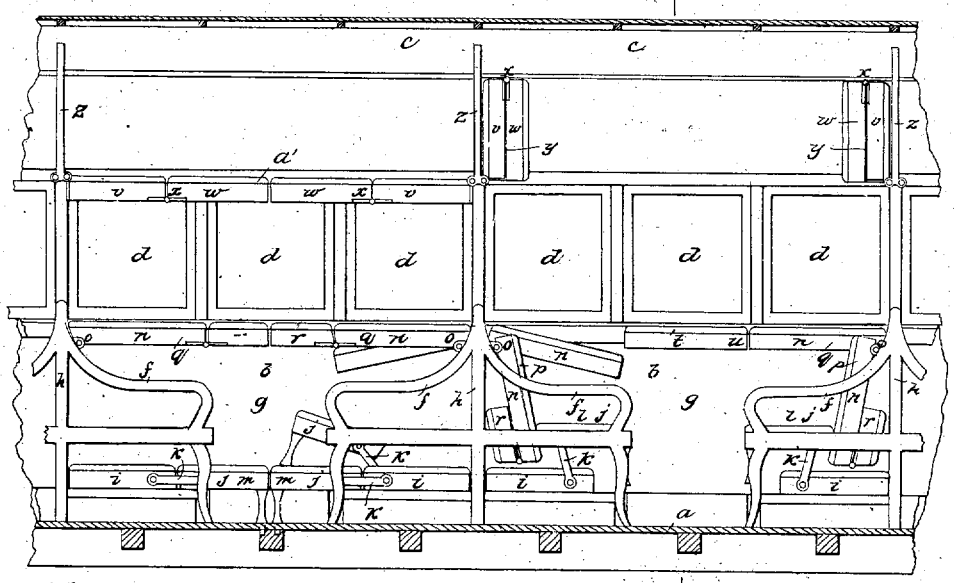

Figure 1 is a central longitudinal vertical section of a portion of a railroad-car, representing the convertible seats in elevation; Fig. 2, a cross vertical section of a car, taken at the line A *a* of Fig. 1, and representing the seats on one side of the car and the seats converted into couches on the other side; and Fig. 3, a section representing a modification.

The same letters indicate like parts in all the figures.

My said invention relates to improvements in convertible seats and couches for railroad-cars, by means of which couches can be provided for as many persons as can be seated when arranged as seats.

In the accompanying drawings, *a* represents the floor of the car, *b b* the sides, *c* the roof, and *d* the windows, all of which may be of the usual construction. There is to be the usual longitudinal passage-way *e* between the ranges of seats, bounded on each side by the end frames, *f*, of the seats, formed, in the usual manner, with arm-supports. The space on each side between the sides of the car and the central passage-way is to be divided into compartments *g g* by cross vertical partitions *h h*, extending up from the floor to about the usual height of the backs of seats, although they may be extended up to any other suitable height, and even to the roof, if desired. In each compartment there are four cushioned frames, *i i i i*, two side by side against each partition *h*, and in front of each of these frames there is another cushioned frame, *j*, of about the same size, and hinged thereto by two metal straps or links, *k k*, which are connected with said frames by a pin or equivalent joint, near the front edge of the frame *i*, and near the back edge of the frame *j*, so that such frame *j* may be thrown back and over the frame *i* to form a seat in the position *i*, or drawn forward to the level of the frame *i*, that the two, in connection with the corresponding two similarly arranged on the opposite side of the compartment, may form a couch, as represented at *m m*. In this way the four movable frames can be made into four seats of the usual height; or, in connection with the four other frames, converted into two couches for passengers to lie down.

The backs *n n n n* of the seats are cushioned frames, connected at their upper ends by hinge-joints *o* with the partitions *h*, so that they can be let down in a nearly vertical position, as represented at *p*, or turned up in a horizontal position, as represented at *q*. To the lower and under edge of each of these backs is hinged another cushioned frame, *r*, of the same width, but shorter, so that the frames *r* may be folded or turned up behind the backs when placed in the position represented at *p*, to form backs for the seats, or turned out in the same plane with the backs when placed in a horizontal position, as represented at *q*, to form an elevated couch, in connection with the corresponding frames on the opposite side. The backs of the two seats, placed side by side, may have their backs arranged in this manner with an additional frame, *r*, so as to form, in connection with the backs of the two opposite seats, two couches side by side; but instead of this the backs of the two opposite seats next to the side of the car may be made without the additional frames *r*, and in that case there is to be an elevated cushion-frame, *t*, attached to and projecting from the side of the car, on a level with the backs when elevated, to fill up the space between the two corresponding backs when thrown up in a horizontal position, to form, in connection with them, one of the elevated couches, as represented at *u*. When the backs are elevated to a horizontal position to form couches they are to be secured by catches and bolts in any suitable manner.

When the seats are to be converted into couches the frames, which form the seats when in the position *l*, are to be drawn out to the position *m m* to form couches, and then the backs can be converted into elevated couches; and when the couches are to be converted into seats the backs are first to be folded, and then the frames *j* elevated and carried back to the position *l* to form the seats. Another elevated couch is formed above the windows in each compartment, in the sides of the car, by the combination of two sets of frames, each set being composed of two cushioned frames, *v w*, hinged together, as at *x*, so that they can be folked up, as represented at *y*, to be out of the way, the frames *v* being, in turn, hinged by their opposite edges to partitions *z*, extending down from the roof and extending out from the side of the car; or these partitions may be continuations of the partitions *h h*. There are two such sets of hinged frames for each compartment, and when they are to be formed into an elevated couch they are folded out in a horizontal position, as represented at *a'*, the two sets uniting in the middle, and there secured in a suitable manner by catches and bolts. In this way five couches may be formed in each compartment, so that, if preferred, the four persons occupying the four seats of each compartment may be accommodated with couches without the necessity of using either the lowest couch nearest the side of the car or the couch formed by the backs of the two seats farthest from the side of the car; or, if desired, the three couches in each compartment nearest the side of the car may be used as such, leaving two seats next to the passage-way *e*.

The several frames above described may be made and cushioned in any suitable manner, as this makes no part of my invention.

Figure 3:
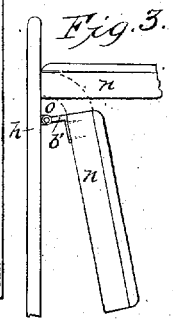

If it should be desired to make the backs *n* of the seats low, or to elevate the couches formed by the backs to a greater height, this may be effected by forming the hinged joint, as represented in Fig. 3, with a projecting stem, *b'*, on each side of the back. In this way the couch will be elevated above the hinge-joint to the extent of the length of the stem.

I do not wish to be understood as limiting my claim of invention to the special arrangement and construction of the several parts, as these may be variously modified by the substitution of equivalent means.

What I claim as my invention, and desire to secure by Letters Patent, is—

1. Connecting and combining the two opposite sets of cross-seats of a railroad-car with additional frames to form the required length of cushioned surfaces to form couches in each compartment, substantially as described.

2. Combining and connecting the backs of opposite cross-seats of a railroad-car, when elevated to a horizontal position, to constitute an elevated couch or couches, substantially as described.

3. Combining with the backs additional frames, substantially as described, to form the required length of couch, and thereby avoid the necessity of making the backs of an inconvenient height when used as backs to the seats.

4. Connecting the backs of opposite cross-seats, when elevated to a horizontal position, to form an elevated couch or couches, substantially as described, in combination with the opposite cross-seats, arranged so as to be convertible into couches, substantially as described.

5. Forming an elevated couch above the couch formed by the backs of seats by a series of hinged frames, substantially as described.

T. T. WOODRUFF.

Witnesses:

ANDREW J. BOSWELL,
WM. D. MULLIN.